United States Patent
Lee et al.

(10) Patent No.: US 9,699,654 B2
(45) Date of Patent: Jul. 4, 2017

(54) AUTHENTICATING MESSAGES IN A WIRELESS COMMUNICATION

(71) Applicant: QUALCOMM Incorporated, San Diego, CA (US)

(72) Inventors: Soo Bum Lee, San Diego, CA (US); Santosh Paul Abraham, San Diego, CA (US); Philip Michael Hawkes, Warrimoo (AU); George Cherian, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/533,969

(22) Filed: Nov. 5, 2014

(65) Prior Publication Data
US 2016/0127901 A1    May 5, 2016

(51) Int. Cl.
| | | |
|---|---|---|
| H04L 9/32 | (2006.01) | |
| H04W 12/06 | (2009.01) | |
| H04W 12/04 | (2009.01) | |
| H04W 84/12 | (2009.01) | |

(52) U.S. Cl.
CPC ........... *H04W 12/06* (2013.01); *H04L 9/3226* (2013.01); *H04W 12/04* (2013.01); *H04W 84/12* (2013.01)

(58) Field of Classification Search
CPC .............................. H04W 12/06; H04L 9/3226
USPC ......................................................... 713/181
See application file for complete search history.

(56) References Cited

U.S. PATENT DOCUMENTS

| | | | |
|---|---|---|---|
| 7,907,734 B2 | 3/2011 | Nishida et al. | |
| 8,270,607 B2 | 9/2012 | Kim et al. | |
| 8,447,033 B2 | 5/2013 | Huh et al. | |
| 2004/0243805 A1* | 12/2004 | Enokida | H04L 63/0823 713/175 |
| 2006/0282675 A1* | 12/2006 | Yao | G06Q 20/401 713/176 |
| 2007/0064939 A1* | 3/2007 | Huh | H04N 7/1675 380/201 |
| 2009/0254754 A1* | 10/2009 | Bellur | H04L 9/006 713/176 |
| 2009/0307766 A1* | 12/2009 | Rose | H04L 1/02 726/13 |
| 2011/0238997 A1* | 9/2011 | Bellur | H04L 63/1458 713/176 |

(Continued)

OTHER PUBLICATIONS

Perrig A., et al "Timed Efficient Stream Loss-Tolerant Authentication (TESLA): Multicast Source Authentication Transform Introduction," Jun. 2005, pp. 22.

(Continued)

*Primary Examiner* — Teshome Hailu
(74) *Attorney, Agent, or Firm* — Won Tae C. Kim

(57) ABSTRACT

Methods, systems, and devices are described for wireless communication at a wireless station. Specifically, the present disclosure prevents a station from decrypting unauthorized messages transmitted by wireless device(s) impersonating an AP. In some examples, the AP may continuously and periodically alter the keys for each transmitted message transmitted to prevent malicious interference by unauthorized devices. In some examples, the method may use a symmetric cipher (e.g., Message Integrity Code) for a message using an undisclosed MIC key.

28 Claims, 12 Drawing Sheets

(56) References Cited

U.S. PATENT DOCUMENTS

2012/0190325 A1* 7/2012 Abu-Hakima ...... H04L 12/1845
455/404.2
2014/0006615 A1* 1/2014 Karnik ................ H04L 63/0227
709/225

OTHER PUBLICATIONS

Ylitalo J., et al., "Re-thinking Security in IP based Micro-Mobility", In proceeding of the Information Security (ISC), Springer Berlin Heidelberg, 2004, vol. 3225, pp. 318-329.
ISA/EPO, International Search Report and Written Opinion of the International Searching Authority, Int'l. App. No. PCT/US2015/056211, Jan. 19, 2016, European Patent Office, Rijswijk, NL, 12 pgs.
Fries et al., "Bootstrapping: Timed Efficient Stream Loss-Tolerant Authentication (TESLA)," RFC 4442, Network Working Group, Fries & Tschofenig, Standards Track, Mar. 2006, pp. 1-18, The Internet Society.

* cited by examiner

AUTHENTICATING MESSAGES IN A WIRELESS COMMUNICATION

BACKGROUND

The following relates generally to wireless communication, and more specifically to authenticating messages in a wireless communication.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless network, for example a wireless local area network (WLAN), such as a wireless fidelity (Wi-Fi) (i.e., IEEE 802.11) network may include an access point (AP) that may communicate with one or more station (STAs) or mobile devices. The AP may be coupled to a network, such as the Internet, and may enable a mobile device to communicate via the network (and/or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

Broadcast and/or multicast messages in a Wi-Fi network offer an AP the ability to distribute data to multiple stations with a single message. Broadcast messages, however, are encrypted with a shared key to prevent unauthenticated stations from decrypting or altering broadcast message without being detected. In some instances, AP may use Group Traffic Key (GTK) and/or Integrity Group Traffic Key (IGTK) to authenticate a multicast message transmitted between the AP and a plurality of stations. However, under the above topology, all stations associated with the AP may be aware of the GTK and the IGTK that is used to encrypt messages. As a result, an adversary group member and/or a malicious non-AP station may impersonate the AP by improperly generating and broadcasting false messages.

SUMMARY

The present disclosure may relate generally to wireless communications systems, and more particularly to improved systems, methods, and/or apparatuses for authenticating messages in a wireless communication. The present disclosure prevents a station from decrypting unauthorized messages transmitted by wireless device(s) impersonating an AP. In some examples, the AP may continuously and periodically alter the keys for each message transmitted by the AP. In some examples, the method may use a symmetric cipher (e.g., Message Integrity Code) for a message using an undisclosed MIC key. However, the key to decrypt the message may not be disclosed until a later time period to prevent message forgery.

Additionally or alternatively, the authentication of a message may be based on a determination that the time stamp of the received key corresponds with a previously disclosed key interval schedule. Specifically, in some examples, the AP may disclose to the station(s) an anticipated time interval for key disclosure. The key interval schedule may be exchanged between the AP and at least one station during an authentication and association period. In other examples, the key disclosure schedule may be transmitted to the station(s) during the handshake period. Thus, a station authenticating a received message may first determine whether the time stamp of the received message corresponds with the previously disclosed key interval schedule. As a result, the station may verify whether the message was transmitted from an authorized AP or a malicious wireless device (e.g., unauthorized stations) on the network.

A method of wireless communication at a STA is described. The method may include receiving a message with a MIC during a first time period, the MIC generated using a key, receiving the key associated with the message during a second time period, determining whether the second time period corresponds with an interval schedule for key disclosure, and authenticating the received MIC based in part on the key.

An apparatus for wireless communication at a STA is described. The apparatus may include a receiver for receiving a message with a MIC during a first time period, the MIC generated using a key, a key identifier for receiving the key associated with the message during a second time period, a key interval component for determining whether the second time period corresponds with an interval schedule for key disclosure, and a MIC verification component for authenticating the received MIC based in part on the key.

A further apparatus for wireless communication at a STA is described. The apparatus may include a processor, memory in electronic communication with the processor, and instructions stored in the memory, wherein the instructions are executable by the processor to receive a message with a MIC during a first time period, the MIC generated using a key, receive the key associated with the message during a second time period, determine whether the second time period corresponds with an interval schedule for key disclosure, and authenticate the received MIC based in part on the key.

A non-transitory computer-readable medium storing code for wireless communication at a STA is described. The code may include instructions executable to receive a message with a MIC during a first time period, the MIC generated using a key, receive the key associated with the message during a second time period, determine whether the second time period corresponds with an interval schedule for key disclosure, and authenticate the received MIC based in part on the key.

Some examples of the method, apparatuses, and/or non-transitory computer-readable medium described above may further include receiving a trust anchor MIC key, and validating the key associated with the message using the trust anchor MIC key. Additionally or alternatively, some examples may include updating the trust anchor key with the validated MIC key.

Some examples of the method, apparatuses, and/or non-transitory computer-readable medium described above may further include receiving a unicast message via a secured channel. Additionally or alternatively, some examples may include authenticating the received message using the authenticated MIC.

In some examples of the method, apparatuses, and/or non-transitory computer-readable medium described above, determining whether the second time period corresponds with the interval schedule for key disclosure comprises identifying a first time stamp associated with the interval schedule for key disclosure, comparing the first time stamp with a second time stamp associated with the second time period, and verifying that the first time stamp matches the second time stamp based on the comparison. Additionally or alternatively, some examples may include discarding the key upon determining that the second time period fails to correspond with the interval schedule for key disclosure.

Some examples of the method, apparatuses, and/or non-transitory computer-readable medium described above may further include receiving the MIC with the message prior to receiving the key during the second time period. Additionally or alternatively, in some examples the interval schedule for key disclosure comprising a plurality of consecutive key disclosure intervals is received during a handshake period between a station and an access point.

In some examples of the method, apparatuses, and/or non-transitory computer-readable medium described above, the handshake period comprises a pre-scheduled time interval, the pre-scheduled time interval comprising at least one of a periodic beacon message, an acknowledgment message, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
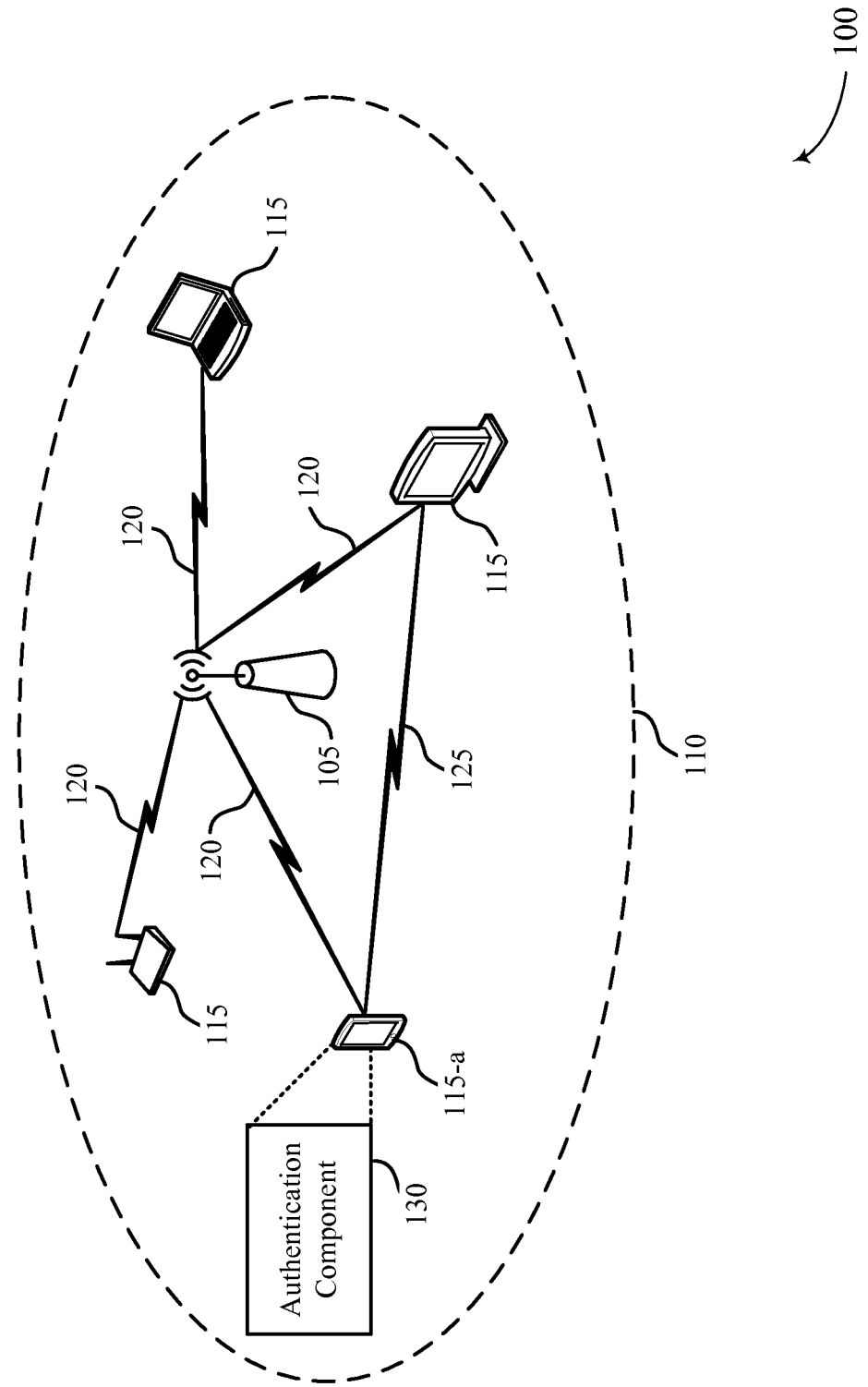
FIG. 1 illustrates a wireless local area network (WLAN) (also known as a wireless fidelity (Wi-Fi) network) for authenticating messages in a wireless communication configured in accordance with various aspects of the present disclosure

The described features generally relate to improved systems, methods, and/or apparatuses for authenticating messages in a wireless communication. As discussed above, the present disclosure prevents a station from decrypting unauthorized messages that may have been transmitted by a malicious device impersonating an authorized AP. In a conventional system, an AP may share the GTK and IGTK with all stations that join the network via the AP. Thus, each station on the network may be able to decrypt messages transmitted from the AP using the GTK and IGTK. However, in some systems, the GTK and the IGTK associated with the AP may remain static for extended periods of time. As a result, a malicious station may be capable of generating and transmitting messages using the static GTK and IGTK. Due to the above-identified security lapse, other stations in the network may become susceptible to receiving improperly transmitted messages.

In one example of the present disclosure, the keys associated with the AP are periodically altered for each message transmitted from the AP. Therefore, in some instances, none of the keys associated with the AP may remain static to allow malicious stations from compromising other stations on the network. Thus, in some examples, the AP may continuously and periodically alter the keys for each message transmitted by the AP. In some examples, the method may use a symmetric cipher (e.g., Message Integrity Code) for a message using an undisclosed MIC key. However, the key to decrypt the message may not be disclosed until a later time period to prevent message forgery. As a result, the additional level of security of the present disclosure allows for preventing unauthenticated stations from impersonating AP to broadcast messages.

Additionally or alternatively, the authentication of a message may be based on a determination that the time stamp of the received key corresponds with a previously disclosed key interval schedule. Specifically, in some examples, the AP may disclose to the station(s) an anticipated time interval for key disclosure. The key interval schedule may be exchanged between the AP and at least one station during an authentication and association period. In other examples, the key disclosure schedule may be transmitted to the station(s) during the handshake period. Thus, a station authenticating a received message may first determine whether the time stamp of the received message corresponds with the previously disclosed key interval schedule. As a result, the station may verify whether the message was transmitted from an authorized AP or a malicious wireless device (e.g., unauthorized stations) on the network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates a WLAN 100 (also known as a Wi-Fi network) configured in accordance with various aspects of the present disclosure. The WLAN 100 may include an access point (AP) 105 and multiple associated station (STAs) 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system (DS) that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (DS) (not shown) may be used to connect APs 105 in an ESS. In some cases, the coverage area 110 of an AP 105 may be divided into sectors (also not shown). The WLAN network 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11 ac, 802.11 ad, 802.11ah, etc. In other implementations, peer-to-peer connections and/or ad hoc networks may be implemented within WLAN network 100.

An APN may be the name of a gateway between a wireless network and another computer network (e.g., the Internet). A STA 115 making a data connection (as opposed to, e.g., a circuit switched voice connection) must be configured with an APN, which it conveys upon accessing the network. A server of the core network may then examine the APN to determine what type of network connection should be created (e.g., what internet protocol (IP) or internet protocol multimedia subsystem (IMS) address should be assigned or what security methods should be used). In other words, the APN may identify the public data network (PDN) that a STA 115 wants to communicate with. In addition to identifying a PDN, an APN may also be used to define a service type (e.g., a wireless application protocol (WAP) server or multimedia messaging service (MMS)) that is provided by the PDN.

In some examples of the present disclosure, the AP 105 may use symmetric cipher (e.g., Message Integrity Code) for bootstrapping and broadcast message authentication. In some instances, a trust anchor MIC key may be provided to stations 115 of the network during the authentication and 4-way handshake period. During the authentication and the handshake period, the AP 105 may additionally transmit a key interval schedule to the stations 115 that may identify time intervals that the AP 105 may disclose keys associated with transmitted messages. In some examples, the key interval schedule may identify a pre-schedule time interval. The key interval schedule may further include a fine-grained timing using a time stamp function (TSF) that may prevent malicious stations on the network from intercepting disclosed key(s) and/or injected a forged message using the key(s). In some examples, the key interval schedule may comprise a plurality of time intervals that correspond with different MIC keys.

In accordance with the present disclosure, the AP 105 may transmit a first message to a STA (e.g., 115-$a$) during a first time period. One or more STAs 115 may include an authentication component 130 configured with functionalities of the present disclosure. In some examples, the authentication component 130 may incorporate features of a communication management module in reference to FIG. 4. Turning back to FIG. 1, the first message transmitted from the AP 105 to at least one station (e.g., 115-$a$) may correspond with a message integrity code (MIC) created by the AP 105 using a MIC key ($K_i$). In some examples, the MIC key for the first message may be transmitted at a second time period to prevent message forgery. Thus, in some examples, the station 115-$a$ upon receiving the first message during the first time period from the AP 105 may wait a pre-determined time period for a subsequent message containing the MIC key to authenticate the first message. In accordance with the present disclosure, although the AP 105 may use key ($K_i$) to create the MIC for the first message, the AP 105 may disclose key ($K_j$) to the STA 115-$a$ during the subsequent message. Upon receiving the disclosed key ($K_j$), the STA 115-$a$ may perform a series of hash functions on the disclosed ($K_j$) to derive at key ($K_i$) originally used to create the MIC for the first message.

The AP 105 subsequently may transmit the MIC key during the second time period for the first message that was previously transmitted during the first time period. Upon receiving the MIC key, the authentication component 130 of the station 115-$a$ may determine whether the second time period corresponds with the key interval schedule disclosed by the AP 105 during the authentication and the handshake period. In the event that the authentication component 130 verifies that the time stamp of the MIC key matches the time stamp identified in the key interval schedule, the authentication component 130 may authenticate the received MIC of the message based in part on the key received during the second time period. Alternatively, if the time stamp of the MIC key fails to match the time stamp identified in the key interval schedule, the authentication component 130 may discard the received key and/or the first message.

Figure 2:
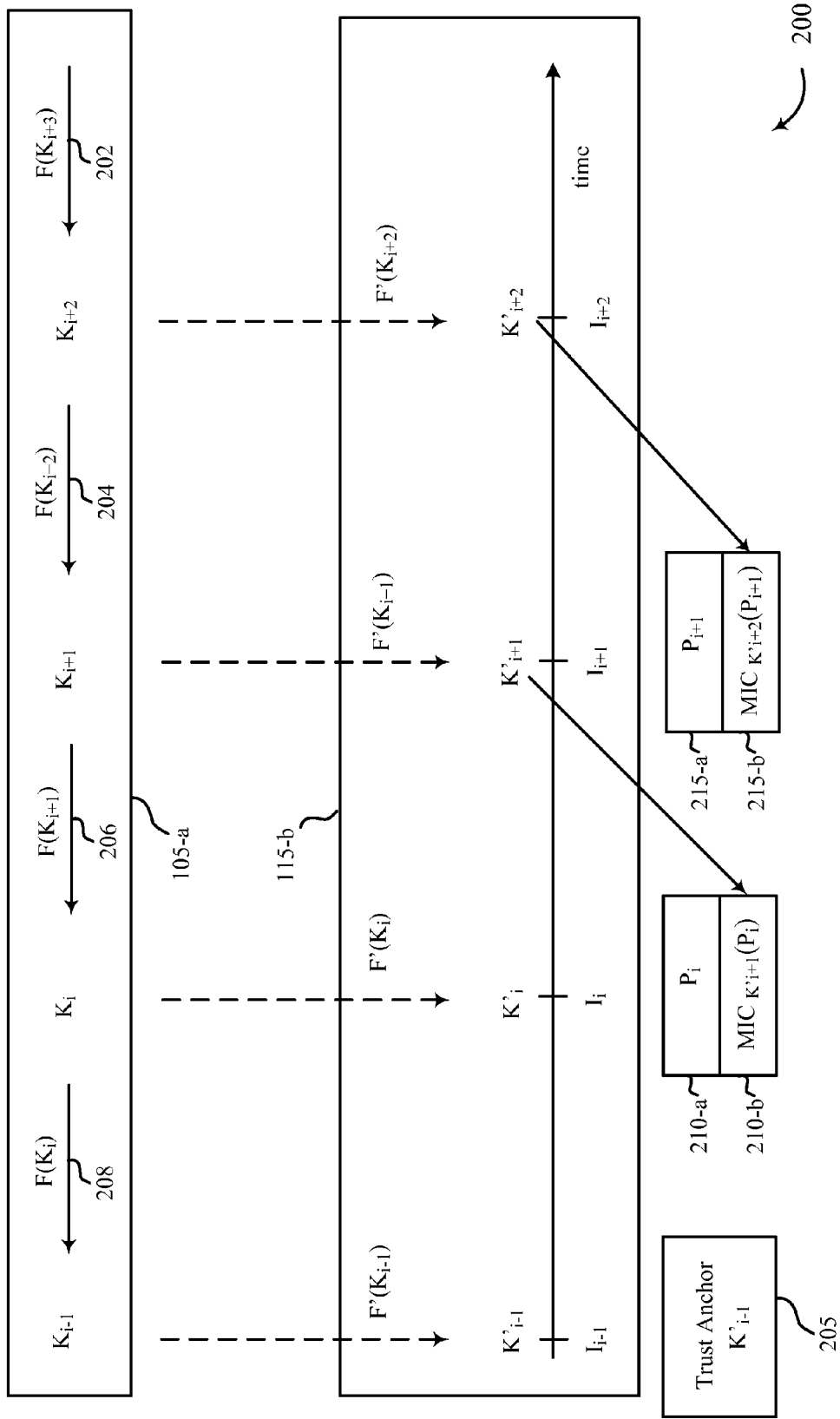
FIG. 2 illustrates an example of a wireless communications subsystem for authenticating messages in a wireless communication in accordance with various aspects of the present disclosure.

FIG. 2 illustrates an example of a wireless communications subsystem 200 for authenticating messages in a wireless communication in accordance with various aspects of the present disclosure. Wireless communications subsystem 200 may include a STA 115-b, which may be an example of a STA 115 described above with reference to FIG. 1. Wireless communications subsystem 200 may also include a AP 105-a, which may be an example of a AP 105 described above with reference to FIG. 1.

In accordance with the present disclosure, the AP 105-a may construct a reverse order key chain in advance by performing a series of hash functions F( )(e.g., 202, 204, 206 and 208) to produce a series of MIC keys (e.g., $K_{i-1}$, $K_i$, $K_{i+1}$, $K_{i+2}$) that may be transmitted to the STA 115-b. In some examples, the AP 105-a may create a MIC, for example MIC 210-b, by generating a key $K'_{i+1}$ from applying a hash function to key ($K_{i+1}$). In one example, the first key $K_{i-1}$ may be a trust anchor key transmitted from the AP 105-b to the STA 115-b in a unicast message 205 over a secure channel. The trust anchor key ($K_{i-1}$) may be used to authenticate all subsequent keys (e.g., $K_i$, $K_{i+1}$, $K_{i+2}$) transmitted by the AP 105-b. In one example, the AP 105-b may also transmit a key interval schedule that identifies the time intervals ($I_i$, $I_{i+1}$, $I_{i+2}$) that the AP 105-a may transmit subsequent keys ($K_i$, $K_{i+1}$, $K_{i+2}$).

Thus, in accordance with the present disclosure, the AP 105-a may transmit a first message 210 during a first time interval ($I_i$). The first message 210 may comprise a payload ($P_i$) 210-a associated with a MIC 210-b. However, the key ($K_{i+1}$) configured to authenticate the MIC 210-b may not be transmitted until a second time period ($I_{i+1}$). In some examples, the key ($K_{i+1}$) may be authenticated by applying function $F(K_{i+1})$ and comparing the result with $K_i$. In accordance with the present disclosure, upon receiving the disclosed key ($K_{i+1}$), the STA 115-b may perform a series of hash functions $F'(K_{i+1})$ on the disclosed ($K_{i+1}$) to derive at key ($K'_{i+1}$) originally used to create the MIC for the first message 210. Similarly, the key ($K'_{i+2}$) configured to authenticate the MIC 215-b of a second message 215 may be transmitted during a third time period ($I_{i+2}$).

In some examples, the STA 115-b may determine whether the second time period ($I_{i+1}$) corresponds with a previously disclosed key interval schedule. Thus, the STA 115-b may compare the time stamp of the second time period ($I_{i+1}$) with a time stamp provided in the key interval schedule by the AP 105-a. Based on the comparison, the STA 115-b may authenticate the received MIC key ($K'_{i+1}$) as authentic. Upon determination that the key ($K'_{i+1}$) transmitted during a second time period ($I_{i+1}$) is authentic, the STA 115-b may authenticate the received payload ($P_i$) 210-a. As a result, the present disclosure seeks to prevent malicious interference by unauthorized stations from impersonating an AP 105-a.

Figure 3:
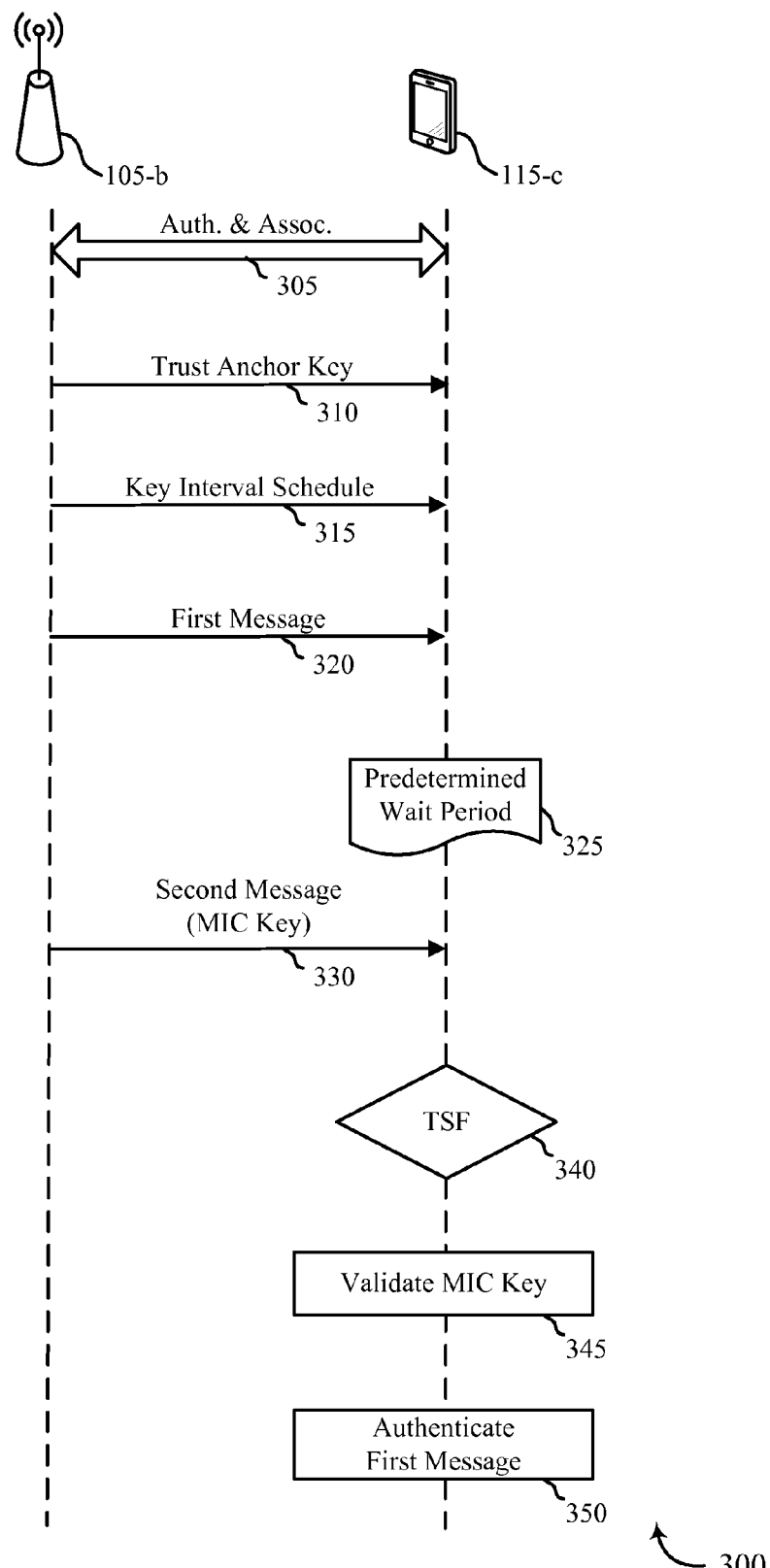
FIG. 3 illustrates an example of a swim diagram between an AP and a STA for authenticating messages in a wireless communication in accordance with various aspects of the present disclosure.

FIG. 3 illustrates an example of a diagram 300 for authenticating messages in a wireless communication in accordance with various aspects of the present disclosure. The diagram 300 may include a STA 115-c, which may be an example of a STA 115 described above with reference to FIGS. 1-2. Diagram 300 may also include a AP 105-b, which may be an example of a AP 105 described above with reference to FIGS. 1-2.

In accordance with the present disclosure, the station 115-c may authenticate and associate 305 with the AP 105-b for access to the network. In some examples, the AP 105-b may additionally transmit a trust anchor MIC key 310 to the STA 115-c. The trust anchor MIC key 310 may be used to authenticate subsequent MIC keys. The trust anchor MIC key 310 may be delivered via a unicast message encrypted and authenticated using a temporary key between AP 105-b and STA 115-c. In some examples the trust anchor MIC key 310 is transmitted to the STA 115-c via a secured channel.

In accordance with other examples of the present disclosure, a service provider may alternatively send one or more trusted AP certificates or public keys to the STA 115-c during a subscription phase. In other examples, the service provider may send a copy of the trusted service provider certificate or public key to the STA 115-c during the subscription phase.

Additionally or alternatively, the AP 105-b may also transmit a key interval schedule 315 to the station 115-c. The key interval schedule 315 may identify a pre-determined schedule for key disclosures by the AP 105-b. In accordance with the present disclosure, each key ($K_i$) is mapped to a time interval $I_i$. The key interval schedule 315 may include a plurality of time intervals, each of which may be used for key disclosure by the AP 105-b. In some examples, the time interval identified in the key interval schedule may be dynamically adjustable to minimize potential attacker from injecting false frames crated using the disclosed key. In accordance with the present disclosure, the key interval schedule 315 may include a fine-grained timing using a TSF that may prevent malicious stations on the network from intercepting disclosed key(s) and/or injected a forged message using the key(s). In some examples, the key interval schedule may comprise a plurality of time intervals that correspond with different MIC keys.

In one example, the key interval schedule 315 may include a start timestamp (STS) $t_i$ for the MIC disclosure, the time slot duration and number of time-slots reserved for MIC key disclosure (e.g., 10 time slots with 2 ms duration). In addition, the key interval schedule 315 may also include a start-index (SIdx) of the MIC key. The SIdx pair may determine the start time and the corresponding index of the key-chain at the start time. In one example, the key interval schedule 315 may be announced in a beacon message transmitted periodically by the AP 105-b. In other examples, the key interval schedule 315 may be disclosed during an acknowledgment message to inform of next MIC key disclosure schedule. Key interval schedule 315 disclosure may be signed using RSA or Elliptic Curve Digital Signature Algorithm (ECDSA).

In some examples, the diagram 300 may comprise the AP 105-b transmitting a first message 320 to the STA 115-c during a first time period. The message may be created using a first message authentication code based on a first MIC key. The STA 115-c, upon receiving the first message 320, may wait a predetermined time period 325 for a subsequent message from AP 105-b containing the first MIC key to authenticate the first message 320. As discussed above, the predetermined time interval that the station 115-c may wait may be short as to prevent an attacker from injecting unauthorized frames using the disclosed key.

Subsequently, the AP 105-b may transmit a second message 330 comprising a first MIC key to authenticate the first message. In response, the STA 115-c may perform a time stamp function (TSF) 340 by comparing the advertised time stamp identified in the key interval schedule 315 with the time stamp of the received second message 330. If the time stamp of the second message corresponds with the time stamp identified by the key interval schedule, the STA 115-c may verify the received key as authentic. However, if the time stamp of the second message does not correspond with the time stamp advertised in the key interval schedule, the station 115-c may reject the received MIC key and discard the first message.

Upon determining that the time stamp associated with the second message corresponds with the key interval schedule, the STA 115-c may validate the MIC key 345 using the trust anchor MIC key 310. In accordance with the present disclosure, although the AP may use key ($K_i$) to create the MIC for the first message, the AP discloses key ($K_j$) to the STA 115-c during the subsequent message. Upon receiving the disclosed key ($K_j$), the STA 115 may perform a series of hash functions on the disclosed ($K_j$) to derive at key ($K_i$) originally used to create the MIC for the first message. Specifically, the STA 115-c may hash the MIC key ($K_j$) received in the second message to validate whether the result of the hashing function corresponds with the trust anchor key. Based on a positive validation of the MIC key received during the second time period against the trust anchor key received during the handshake period, the STA 115-c may authenticate the first message using the MIC key. Conversely, if results of hashing the MIC key do not correspond with the trust anchor key, the STA 115-c may discard the received MIC key and the first message.

Figure 4:
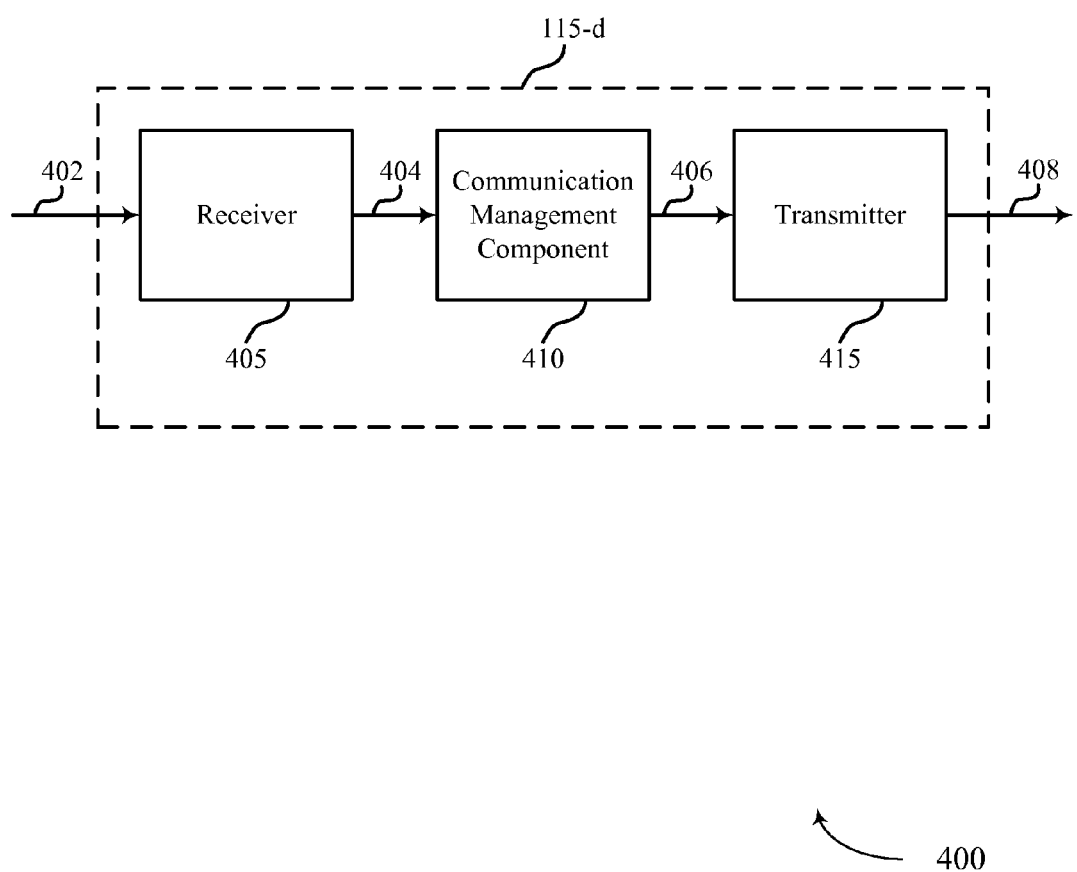
FIG. 4 shows a block diagram of a STA configured for authenticating messages in a wireless communication in accordance with various aspects of the present disclosure.

FIG. 4 shows a block diagram 400 of a STA 115-d configured for authenticating messages in a wireless communication in accordance with various aspects of the present disclosure. The STA 115-d may be an example of aspects of a STA 115 described with reference to FIGS. 1-3. The STA 115-d may include a receiver 405, a communication management component 410, and/or a transmitter 415. The STA 115-d may also include a processor. Each of these components may be in communication with each other.

The components of the STA 115-d may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 405 may receive information 402 such as packets, user data, and/or control information associated with various information channels (e.g., control channels, data channels, and information related to authenticating messages in a wireless communication, etc.). Information may be passed on to the communication management component 410, and to other components of the STA 115-d via signal 404. In some examples, the receiver 405 may receive a message with a MIC during a first time period, the MIC generated using a key. In some examples, the receiver 405 may receive a trust anchor MIC key. In some examples, the receiver 405 may receive the MIC with the message prior to receiving the key during the second time period.

The communication management component 410 may receive a message with a MIC during a first time period, the MIC generated using a key, receive the key associated with the message during a second time period, determine whether the second time period corresponds with an interval schedule for key disclosure, and authenticate the received MIC based in part on the key.

The transmitter 415 may transmit signals 408 received from other components of the STA 115-d. In some embodiments, the transmitter 415 may be collocated with the receiver 405 in a transceiver module. The transmitter 415 may include a single antenna, or it may include a plurality of antennas.

Figure 5:
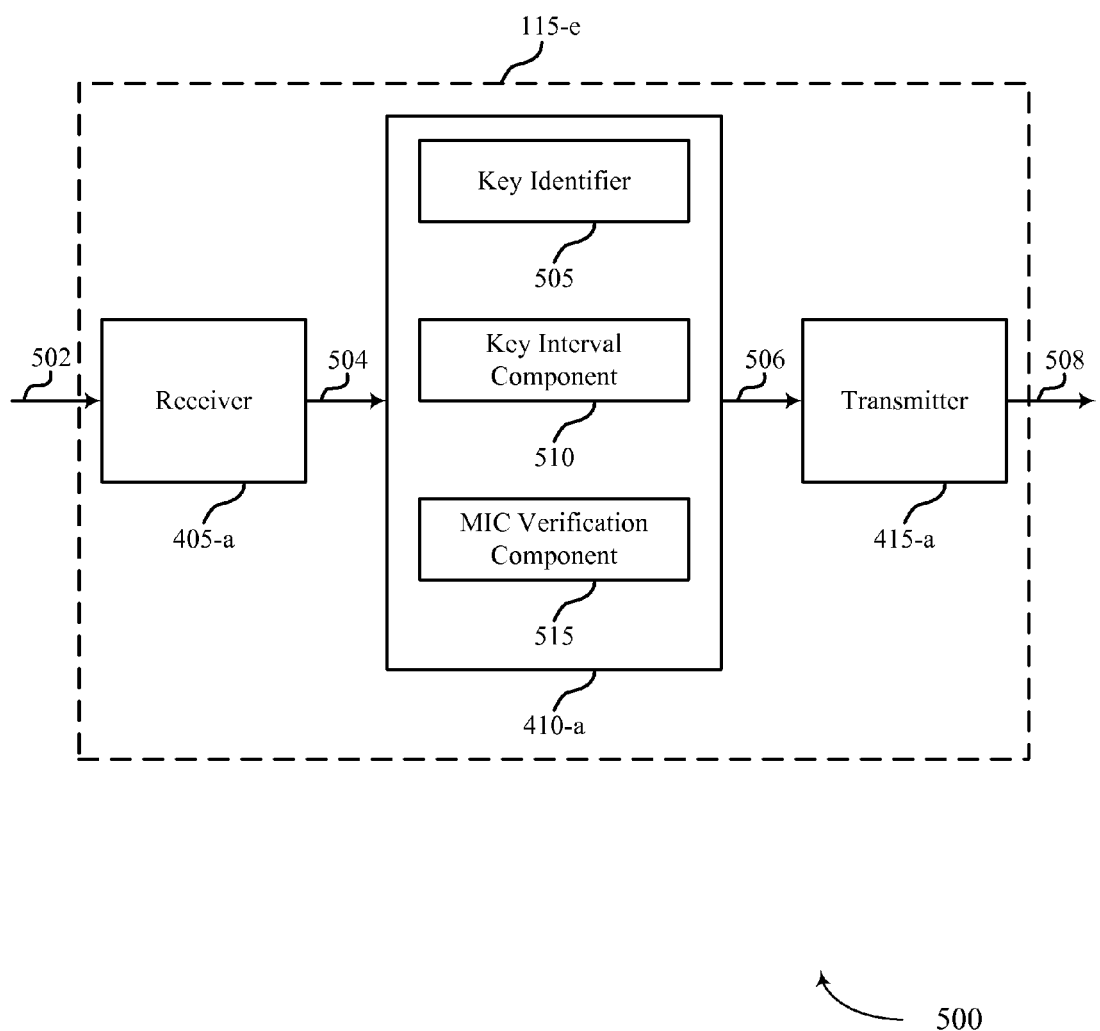
FIG. 5 shows a block diagram of a STA configured for authenticating messages in a wireless communication in accordance with various aspects of the present disclosure.

FIG. 5 shows a block diagram 500 of a STA 115-e for authenticating messages in a wireless communication in accordance with various aspects of the present disclosure. The STA 115-e may be an example of aspects of a STA 115 described with reference to FIGS. 1-4. The STA 115-e may include a receiver 405-a, a communication management component 410-a, and/or a transmitter 415-a. The STA 115-e may also include a processor. Each of these components may be in communication with each other. The communication management component 410-a may also include a key identifier 505, a key interval component 510, and a MIC verification component 515.

The components of the STA 115-e may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 405-a may receive information 502 which may be passed on to the -a, and to other components of the STA 115-e. In some examples, the receiver 405-a may transmit received information to communication management component 410-a via signals 504. The communication management component 410-a may perform the operations described above with reference to FIG. 4. The transmitter 415-a may transmit signals 508 received from other components of the STA 115-e.

The key identifier 505 may receive the key associated with the message during a second time period as described above with reference to FIGS. 2-3.

The key interval component 510 may determine whether the second time period corresponds with an interval schedule for key disclosure as described above with reference to FIGS. 2-3. In some examples, the interval schedule for key disclosure may be received during a handshake period between a station and an access point. In some examples, the handshake period comprises a pre-scheduled time interval, the pre-scheduled time interval comprising at least one of a periodic beacon message, an acknowledgment message, or a combination thereof.

The MIC verification component 515 may authenticate the received MIC based in part on the key as described above with reference to FIGS. 2-3.

Figure 6:
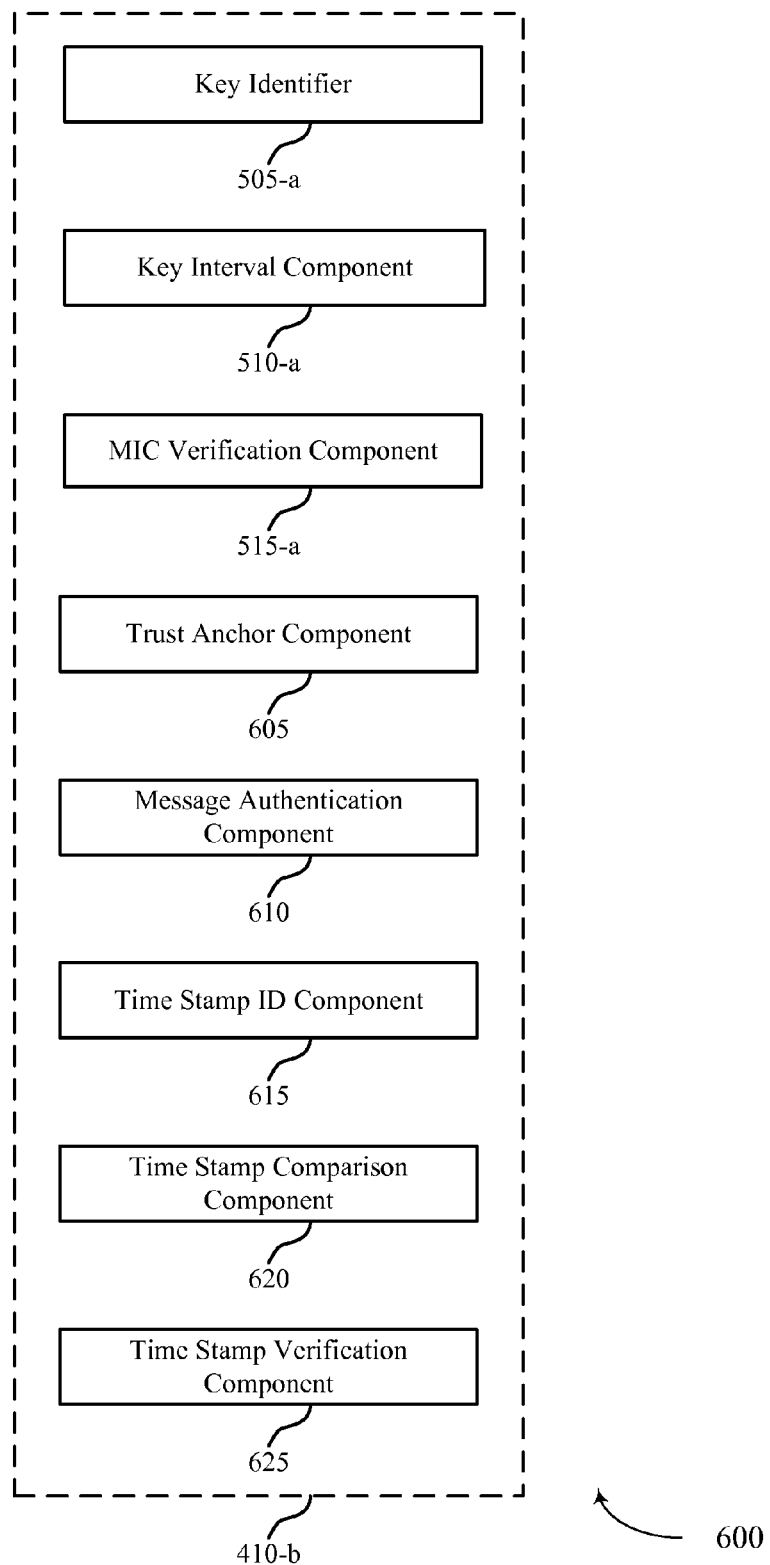
FIG. 6 shows a block diagram of a communication management component configured for authenticating messages in a wireless communication in accordance with various aspects of the present disclosure.

FIG. 6 shows a block diagram 600 of a communication management component 410-b for authenticating messages in a wireless communication in accordance with various aspects of the present disclosure. The communication management component 410-b may be an example of aspects of a communication management component 410 described with reference to FIGS. 4-5. The communication management component 410-b may include a key identifier 505-a, a key interval component 510-a, and a MIC verification component 515-a. Each of these modules may perform the functions described above with reference to FIG. 5. The communication management component 410-b may also include a trust anchor component 605, a message authentication component 610, a time stamp identification (ID)

component 615, a time stamp comparison component 620, and a time stamp verification component 625.

The components of the communication management component 410-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The trust anchor component 605 may validate the key associated with the message using the trust anchor MIC key as described above with reference to FIGS. 2-3. The trust anchor component 605 may also update the trust anchor key with the validated key as described above with reference to FIGS. 2-3.

The message authentication component 610 may authenticate the received message using the authenticated MIC as described above with reference to FIGS. 2-3.

The time stamp ID component 615 may be configured such that determining whether the second time period corresponds with the interval schedule for key disclosure may include identifying a first time stamp associated with the interval schedule for key disclosure as described above with reference to FIGS. 2-3.

The time stamp comparison component 620 may compare the first time stamp with a second time stamp associated with the second time period as described above with reference to FIGS. 2-3.

The time stamp verification component 625 may verify that the first time stamp matches the second time stamp based on the comparison as described above with reference to FIGS. 2-3. The time stamp verification component 625 may also discard the key upon determining that the second time period fails to correspond with the interval schedule for key disclosure as described above with reference to FIGS. 2-3.

Figure 7:
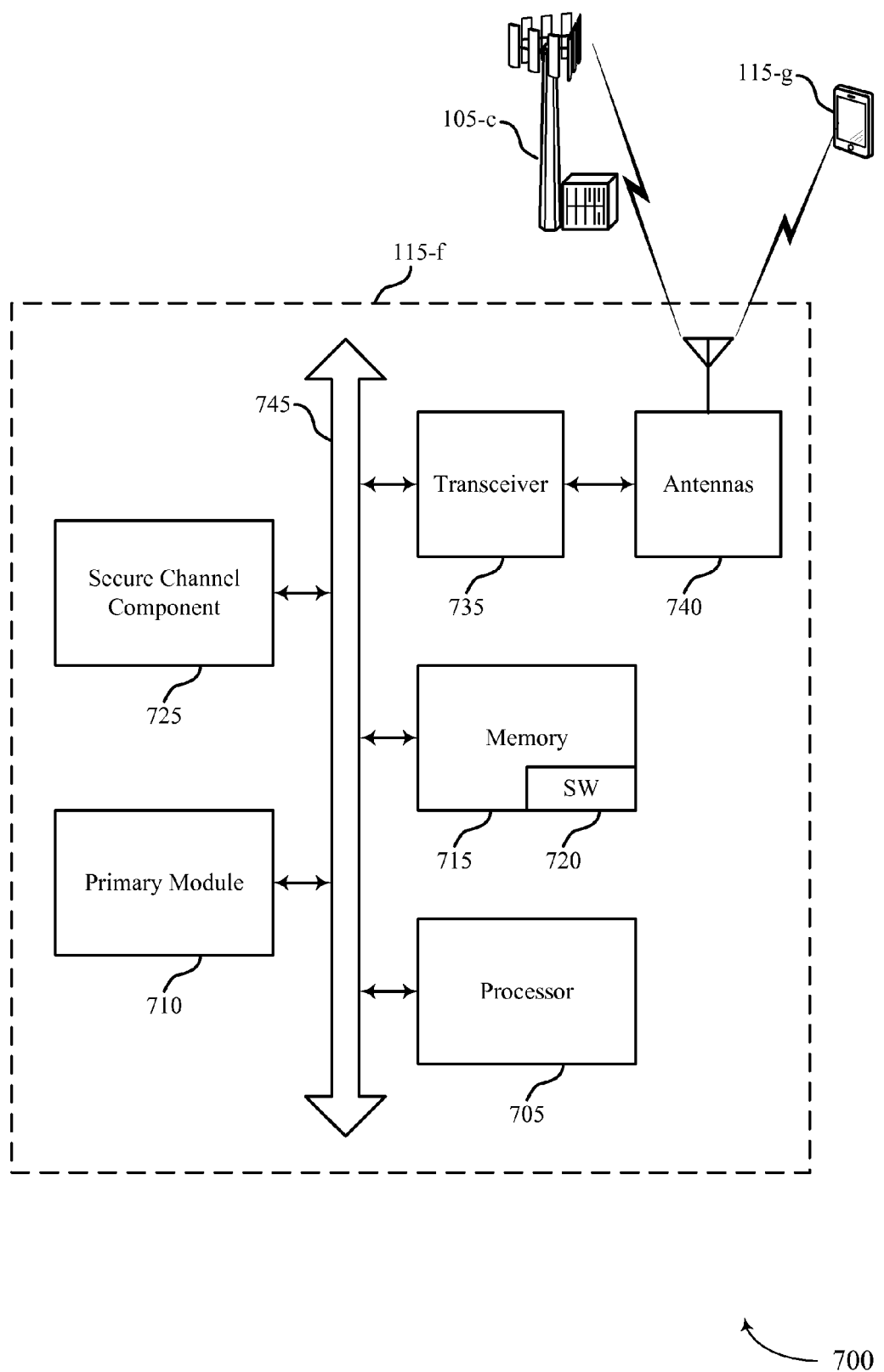
FIG. 7 illustrates a block diagram of a system including a STA configured for authenticating messages in a wireless communication in accordance with various aspects of the present disclosure.

FIG. 7 shows a diagram of a system 700 including a STA 115 configured for authenticating messages in a wireless communication in accordance with various aspects of the present disclosure. System 700 may include a STA 115-f, which may be an example of a STA 115-f described above with reference to FIGS. 1-6. The STA 115-f may include a communication management component 710, which may be an example of a communication management component 410 described with reference to FIGS. 2-6. The STA 115-f may also include a secure channel component. The STA 115-f may also include components for bi-directional voice and data communications including components for transmitting communications and components for receiving communications. For example, the STA 115-f may communicate bi-directionally with STA 115-g and/or a AP 105-c.

The secure channel component may receive a unicast message via a secured channel as described above with reference to FIGS. 2-3.

The STA 115-f may also include a processor module 705, and memory 715 (including software (SW)) 720, a transceiver module 735, and one or more antenna(s) 740, which each may communicate, directly or indirectly, with each other (e.g., via buses 745). The transceiver module 735 may communicate bi-directionally, via the antenna(s) 740 and/or wired or wireless links, with one or more networks, as described above. For example, the transceiver module 735 may communicate bi-directionally with a AP 105 and/or another STA 115. The transceiver module 735 may include a modem to modulate the packets and provide the modulated packets to the antenna(s) 740 for transmission, and to demodulate packets received from the antenna(s) 740. While the STA 115-f may include a single antenna 740, the STA 115-f may also have multiple antennas 740 capable of concurrently transmitting and/or receiving multiple wireless transmissions.

The memory 715 may include random access memory (RAM) and read only memory (ROM). The memory 715 may store computer-readable, computer-executable software/firmware code 720 including instructions that, when executed, cause the processor module 705 to perform various functions described herein (e.g., authenticating messages in a wireless communication, etc.). Alternatively, the software/firmware code 720 may not be directly executable by the processor module 705 but cause a computer (e.g., when compiled and executed) to perform functions described herein. The processor module 705 may include an intelligent hardware device, e.g., a central processing unit (CPU), a microcontroller, an ASIC, etc.

Figure 8:
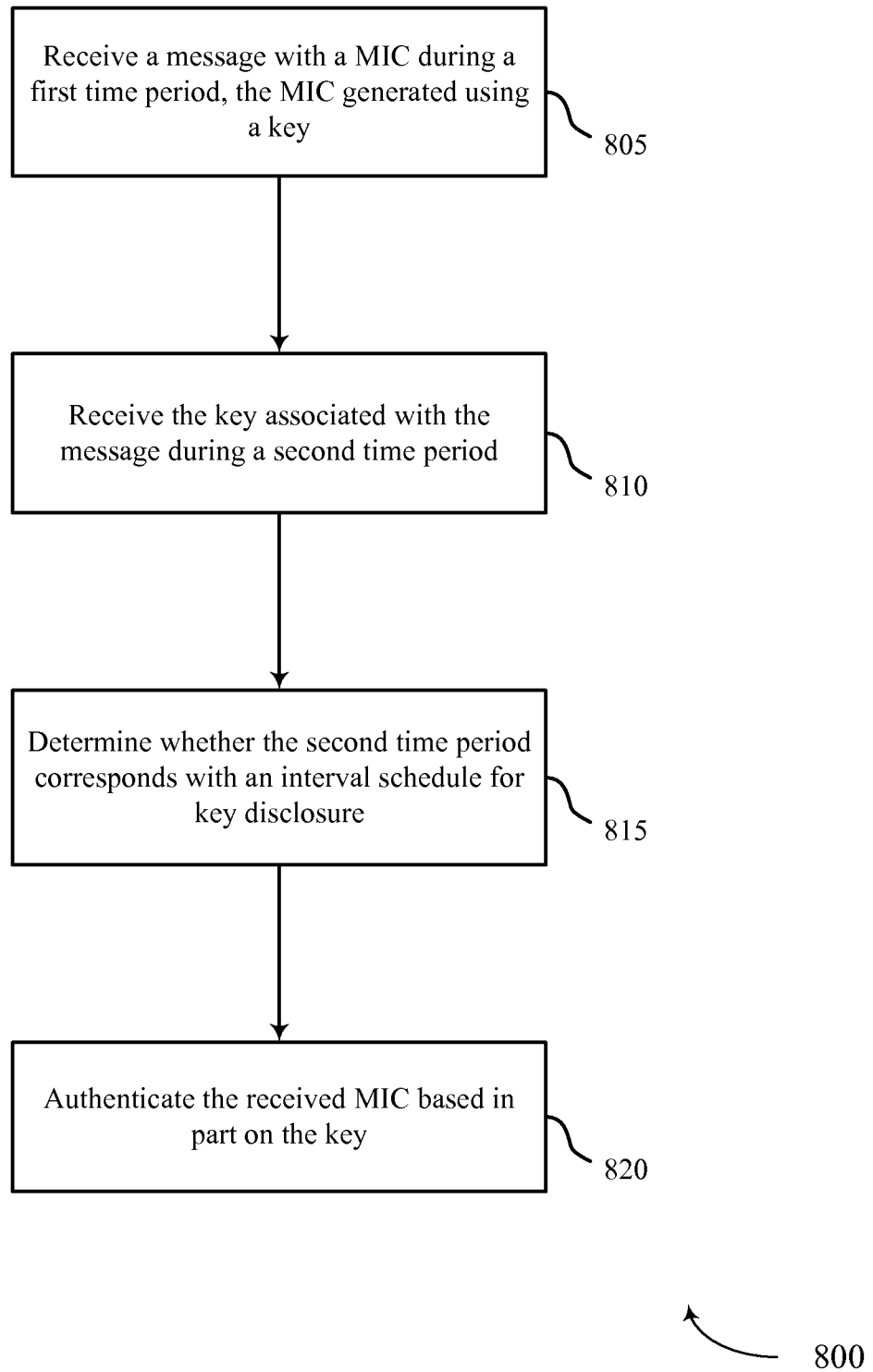
FIG. 8 shows a flowchart illustrating a method for authenticating messages in a wireless communication in accordance with various aspects of the present disclosure.

FIG. 8 shows a flowchart illustrating a method 800 for authenticating messages in a wireless communication in accordance with various aspects of the present disclosure. The operations of method 800 may be implemented by a STA 115 or its components as described with reference to FIGS. 1-7. For example, the operations of method 800 may be performed by the communication management component 410 as described with reference to FIGS. 4-7. In some examples, a STA 115 may execute a set of codes to control the functional elements of the STA 115 to perform the functions described below. Additionally or alternatively, the STA 115 may perform aspects the functions described below using special-purpose hardware.

At block 805, the STA 115 may receive a message with a MIC during a first time period, the MIC generated using a key as described above with reference to FIGS. 2-3. In certain examples, the operations of block 805 may be performed by the receiver 405 as described above with reference to FIG. 4.

At block 810, the STA 115 may receive the key associated with the message during a second time period as described above with reference to FIGS. 2-3. In certain examples, the operations of block 810 may be performed by the key identifier 505 as described above with reference to FIG. 5.

At block 815, the STA 115 may determine whether the second time period corresponds with an interval schedule for key disclosure as described above with reference to FIGS. 2-3. In certain examples, the operations of block 815 may be performed by the key interval component 510 as described above with reference to FIG. 5.

At block 820, the STA 115 may authenticate the received MIC based in part on the key as described above with reference to FIGS. 2-3. In certain examples, the operations of block 820 may be performed by the MIC verification component 515 as described above with reference to FIG. 5.

Figure 9:
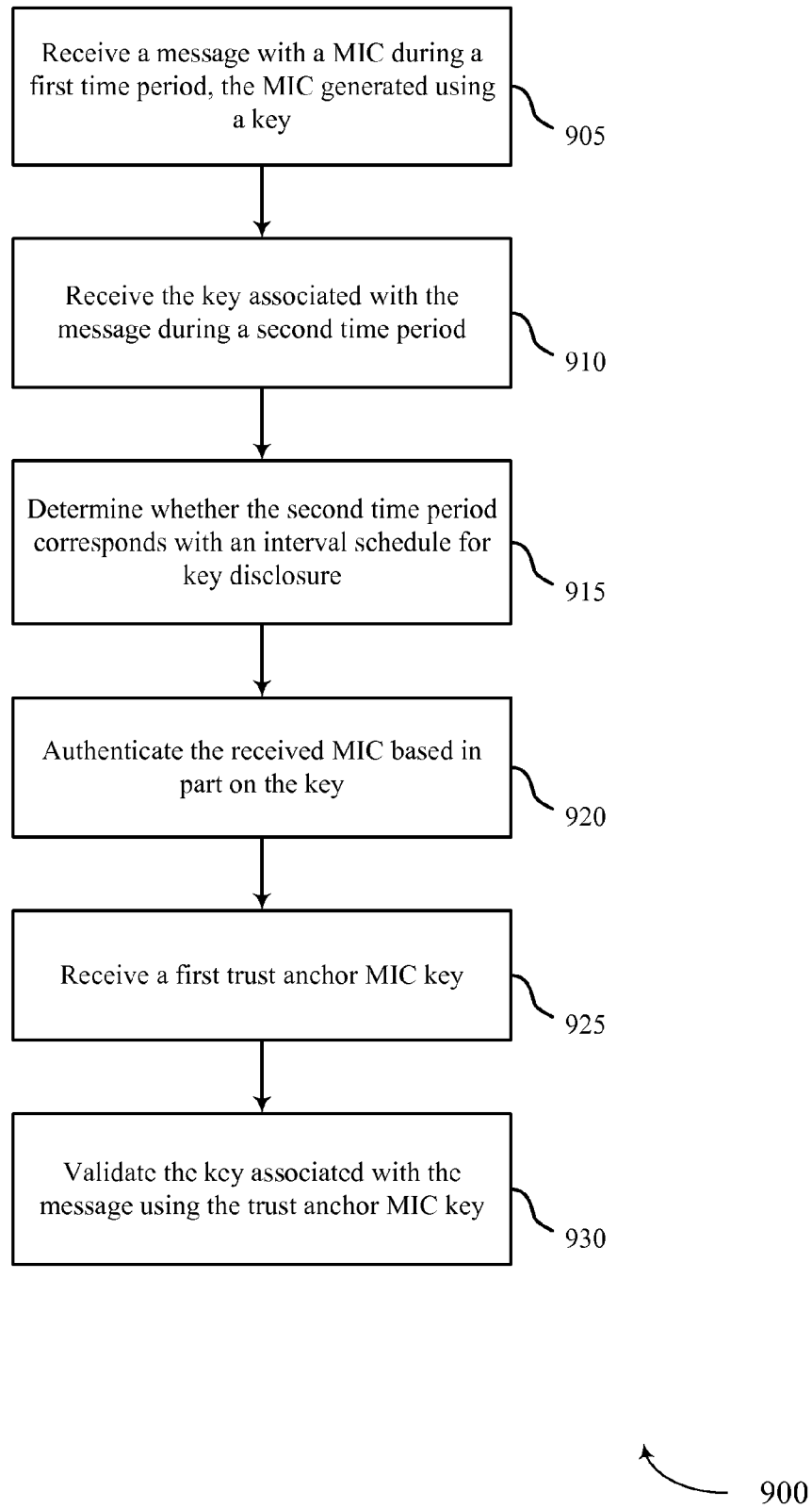
FIG. 9 shows a flowchart illustrating a method for authenticating messages in a wireless communication in accordance with various aspects of the present disclosure.

FIG. 9 shows a flowchart illustrating a method 900 for authenticating messages in a wireless communication in accordance with various aspects of the present disclosure. The operations of method 900 may be implemented by a STA 115 or its components as described with reference to FIGS. 1-7. For example, the operations of method 900 may be performed by the communication management component 410 as described with reference to FIGS. 4-7. In some examples, a STA 115 may execute a set of codes to control the functional elements of the STA 115 to perform the functions described below. Additionally or alternatively, the STA 115 may perform aspects the functions described below using special-purpose hardware. The method 900 may also incorporate aspects of method 800 of FIG. 8.

At block 905, the STA 115 may receive a message with a MIC during a first time period, the MIC generated using a key as described above with reference to FIGS. 2-3. In certain examples, the operations of block 905 may be performed by the receiver 405 as described above with reference to FIG. 4.

At block 910, the STA 115 may receive the key associated with the message during a second time period as described above with reference to FIGS. 2-3. In certain examples, the operations of block 910 may be performed by the key identifier 505 as described above with reference to FIG. 5.

At block 915, the STA 115 may determine whether the second time period corresponds with an interval schedule for key disclosure as described above with reference to FIGS. 2-3. In certain examples, the operations of block 915 may be performed by the key interval component 510 as described above with reference to FIG. 5.

At block 920, the STA 115 may authenticate the received MIC based in part on the key as described above with reference to FIGS. 2-3. In certain examples, the operations of block 920 may be performed by the MIC verification component 515 as described above with reference to FIG. 5.

At block 925, the STA 115 may receive a trust anchor MIC key as described above with reference to FIGS. 2-3. In certain examples, the operations of block 925 may be performed by the receiver 405 as described above with reference to FIG. 4.

At block 930, the STA 115 may validate the key associated with the message using the trust anchor MIC key as described above with reference to FIGS. 2-3. In certain examples, the operations of block 930 may be performed by the trust anchor component 605 as described above with reference to FIG. 6.

Figure 10:
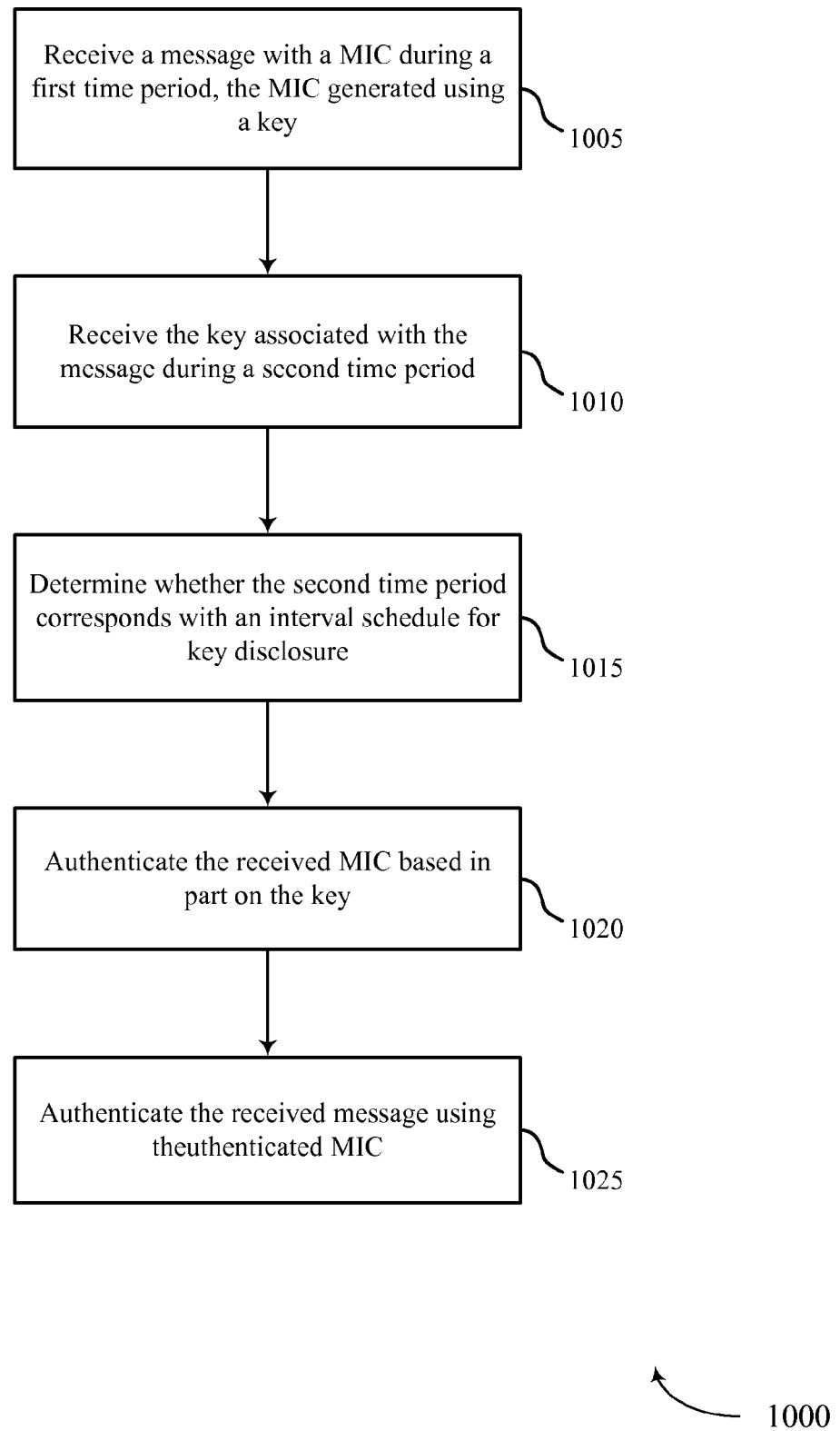
FIG. 10 shows a flowchart illustrating a method for authenticating messages in a wireless communication in accordance with various aspects of the present disclosure.

FIG. 10 shows a flowchart illustrating a method 1000 for authenticating messages in a wireless communication in accordance with various aspects of the present disclosure. The operations of method 1000 may be implemented by a STA 115 or its components as described with reference to FIGS. 1-7. For example, the operations of method 1000 may be performed by the communication management component 410 as described with reference to FIGS. 4-7. In some examples, a STA 115 may execute a set of codes to control the functional elements of the STA 115 to perform the functions described below. Additionally or alternatively, the STA 115 may perform aspects the functions described below using special-purpose hardware. The method 1000 may also incorporate aspects of methods 800, and 900 of FIGS. 8-9.

At block 1005, the STA 115 may receive a message with a MIC during a first time period, the MIC generated using a key as described above with reference to FIGS. 2-3. In certain examples, the operations of block 1005 may be performed by the receiver 405 as described above with reference to FIG. 4.

At block 1010, the STA 115 may receive the key associated with the message during a second time period as described above with reference to FIGS. 2-3. In certain examples, the operations of block 1010 may be performed by the key identifier 505 as described above with reference to FIG. 5.

At block 1015, the STA 115 may determine whether the second time period corresponds with an interval schedule for key disclosure as described above with reference to FIGS. 2-3. In certain examples, the operations of block 1015 may be performed by the key interval component 510 as described above with reference to FIG. 5.

At block 1020, the STA 115 may authenticate the received MIC based in part on the key as described above with reference to FIGS. 2-3. In certain examples, the operations of block 1020 may be performed by the MIC verification component 515 as described above with reference to FIG. 5.

At block 1025, the STA 115 may authenticate the received message using the authenticated MIC as described above with reference to FIGS. 2-3. In certain examples, the operations of block 1025 may be performed by the message authentication component 610 as described above with reference to FIG. 6.

Figure 11:
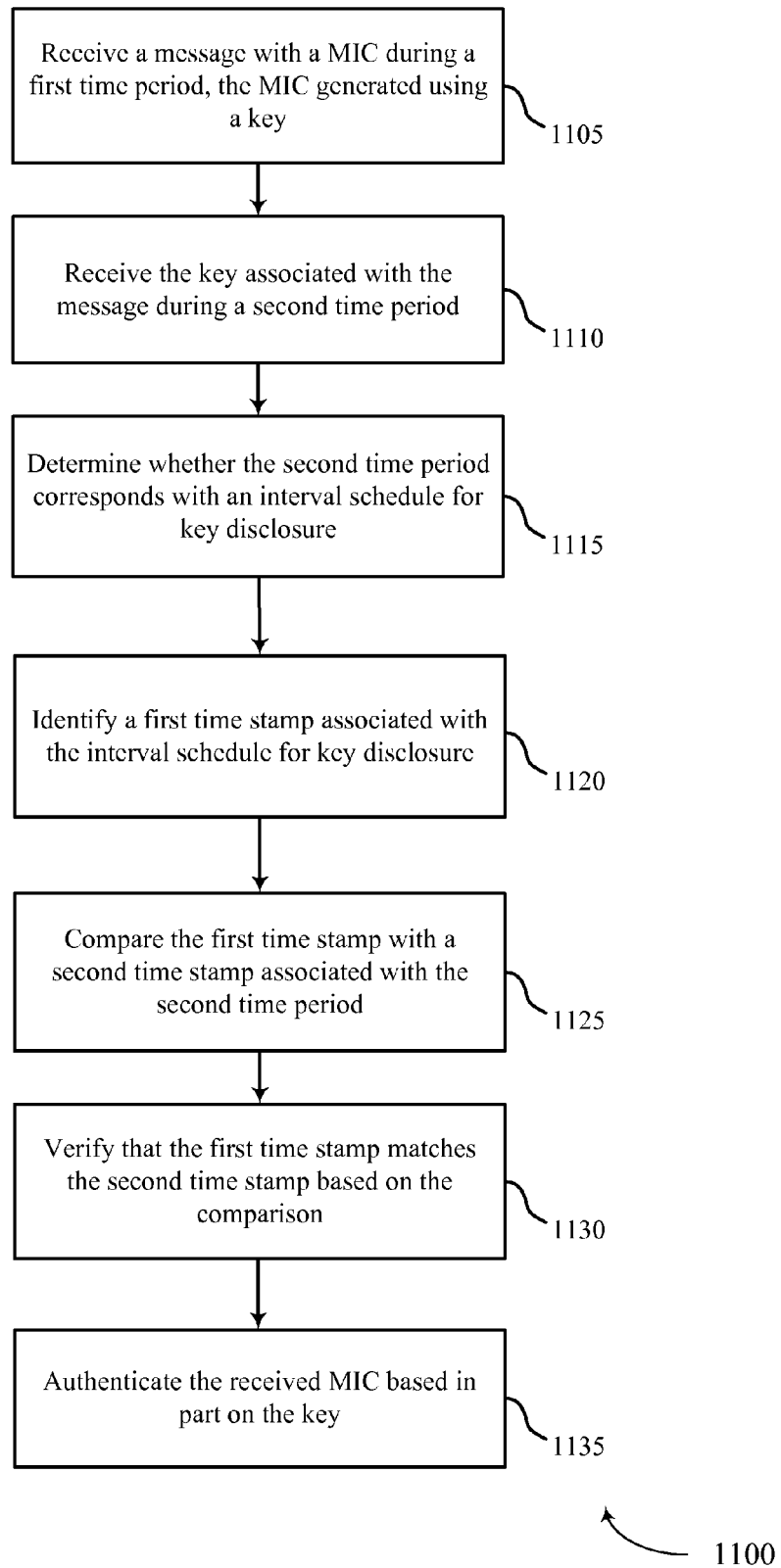
FIG. 11 shows a flowchart illustrating a method for authenticating messages in a wireless communication in accordance with various aspects of the present disclosure.

FIG. 11 shows a flowchart illustrating a method 1100 for authenticating messages in a wireless communication in accordance with various aspects of the present disclosure. The operations of method 1100 may be implemented by a STA 115 or its components as described with reference to FIGS. 1-7. For example, the operations of method 1100 may be performed by the communication management component 410 as described with reference to FIGS. 4-7. In some examples, a STA 115 may execute a set of codes to control the functional elements of the STA 115 to perform the functions described below. Additionally or alternatively, the STA 115 may perform aspects the functions described below using special-purpose hardware. The method 1100 may also incorporate aspects of methods 800, 900, and 1000 of FIGS. 8-10.

At block 1105, the STA 115 may receive a message with a MIC during a first time period, the MIC generated using a key as described above with reference to FIGS. 2-3. In certain examples, the operations of block 1105 may be performed by the receiver 405 as described above with reference to FIG. 4.

At block 1110, the STA 115 may receive the key associated with the message during a second time period as described above with reference to FIGS. 2-3. In certain examples, the operations of block 1110 may be performed by the key identifier 505 as described above with reference to FIG. 5.

At block 1115, the STA 115 may determine whether the second time period corresponds with an interval schedule for key disclosure as described above with reference to FIGS. 2-3. In certain examples, the operations of block 1115 may be performed by the key interval component 510 as described above with reference to FIG. 5.

At block 1120, the STA 115 may identify a first time stamp associated with the interval schedule for key disclosure as described above with reference to FIGS. 2-3. In certain examples, the operations of block 1120 may be performed by the time stamp ID component 615 as described above with reference to FIG. 6.

At block 1125, the STA 115 may compare the first time stamp with a second time stamp associated with the second time period as described above with reference to FIGS. 2-3. In certain examples, the operations of block 1125 may be performed by the time stamp comparison component 620 as described above with reference to FIG. 6.

At block 1130, the STA 115 may verify that the first time stamp matches the second time stamp based on the comparison as described above with reference to FIGS. 2-3. In certain examples, the operations of block 1135 may be performed by the time stamp verification component 625 as described above with reference to FIG. 6.

At block 1135, the STA 115 may authenticate the received MIC based in part on the key as described above with reference to FIGS. 2-3. In certain examples, the operations of block 1135 may be performed by the message authentication component 610 as described above with reference to FIG. 6.

Figure 12:
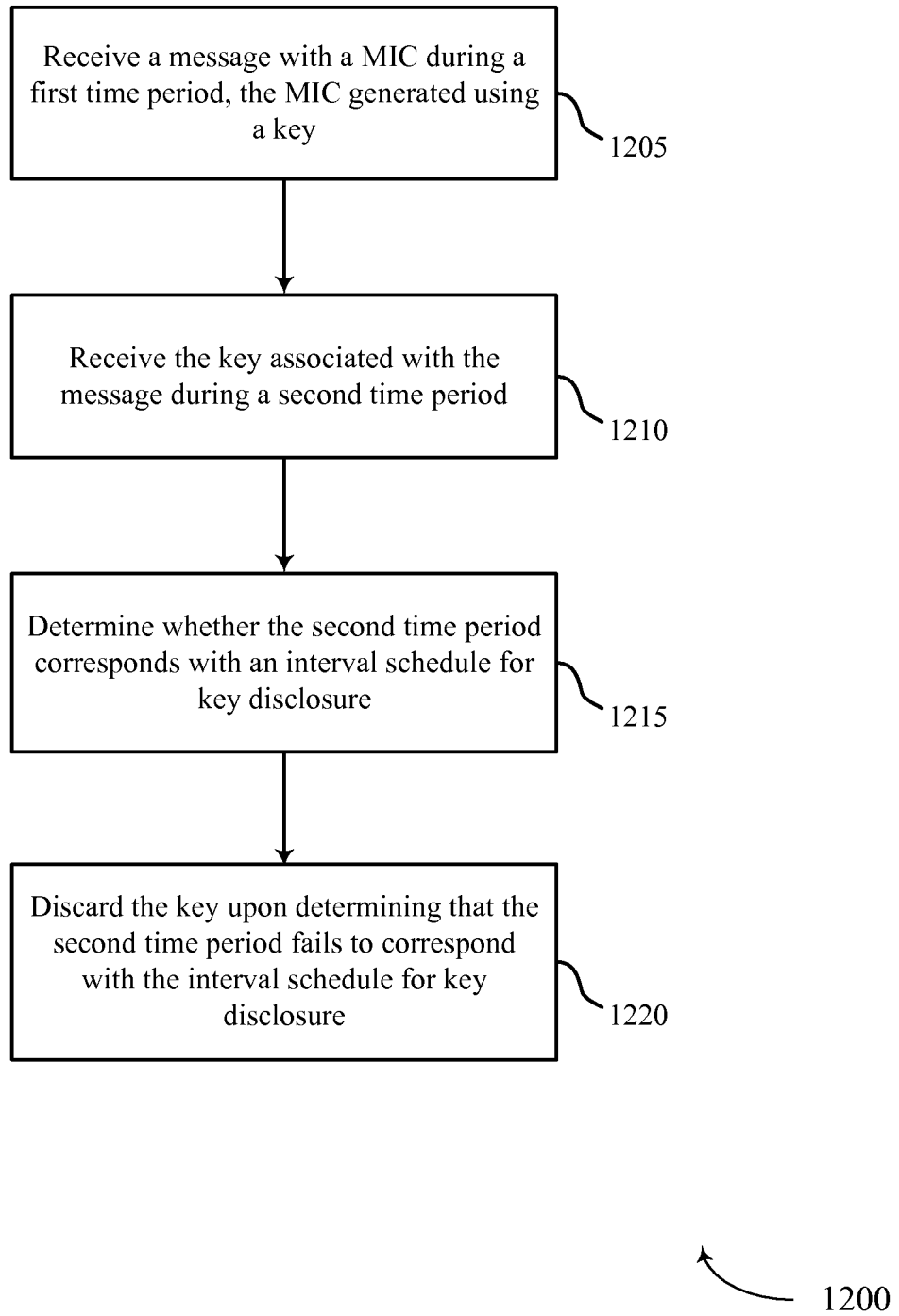
FIG. 12 shows a flowchart illustrating a method for authenticating messages in a wireless communication in accordance with various aspects of the present disclosure.

FIG. 12 shows a flowchart illustrating a method 1200 for authenticating messages in a wireless communication in accordance with various aspects of the present disclosure. The operations of method 1200 may be implemented by a STA 115 or its components as described with reference to FIGS. 1-7. For example, the operations of method 1200 may be performed by the communication management component 410 as described with reference to FIGS. 4-7. In some examples, a STA 115 may execute a set of codes to control the functional elements of the STA 115 to perform the functions described below. Additionally or alternatively, the STA 115 may perform aspects the functions described below using special-purpose hardware. The method 1200 may also incorporate aspects of methods 800, 900, 1000, and 1100 of FIGS. 8-11.

At block 1205, the STA 115 may receive a message with a MIC during a first time period, the MIC generated using a key as described above with reference to FIGS. 2-3. In certain examples, the operations of block 1205 may be performed by the receiver 405 as described above with reference to FIG. 4.

At block 1210, the STA 115 may receive the key associated with the message during a second time period as described above with reference to FIGS. 2-3. In certain examples, the operations of block 1210 may be performed by the key identifier 505 as described above with reference to FIG. 5.

At block 1215, the STA 115 may determine whether the second time period corresponds with an interval schedule for key disclosure as described above with reference to FIGS. 2-3. In certain examples, the operations of block 1215 may be performed by the key interval component 510 as described above with reference to FIG. 5.

At block 1220, the STA 115 may discard the key upon determining that the second time period fails to correspond with the interval schedule for key disclosure as described above with reference to FIGS. 2-3. In certain examples, the operations of block 1220 may be performed by the time stamp verification component 625 as described above with reference to FIG. 6.

Thus, methods 800, 900, 1000, 1100, and 1200 may provide for authenticating messages in a wireless communication. It should be noted that methods 800, 900, 1000, 1100, and 1200 describe possible implementation, and that the operations and the steps may be rearranged or otherwise modified such that other implementations are possible. In some examples, aspects from two or more of the methods 800, 900, 1000, 1100, and 1200 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks, components and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of authenticating messages in a wireless communication, comprising:
   receiving a first message with a message integrity code (MIC);
   receiving a key associated with the first message in a second message, wherein the second message is different from, received subsequent to, and used at least in part to authenticate the first message;
   applying a hash function to the key to generate a derived key;
   receiving a trust anchor MIC key;
   determining the key is authentic based at least in part on the derived key, the trust anchor MIC key, and comparing a time stamp of the second message with an interval schedule that indicates in which time interval of a plurality of scheduled time intervals to anticipate disclosure of the key; and
   authenticating the first message based in part on the key and the determining.

2. The method of claim 1, further comprising:
   updating the trust anchor MIC key with the authenticated key.

3. The method of claim 1, further comprising:
   receiving a unicast message via a secured channel.

4. The method of claim 1, further comprising:
   authenticating the MIC based at least in part on the key, wherein authenticating the received first message is based in part on the authenticated MIC.

5. The method of claim 1, wherein determining the key is authentic comprises:
   verifying that the time stamp of the second message matches a time stamp associated with the interval schedule.

6. The method of claim 1, further comprising:
   receiving a second key associated with the first message in a third message, wherein the third message is different from, and received subsequent to, the first message; and
   discarding the second key upon determining that a second time stamp of the third message fails to correspond with a time stamp associated with the interval schedule.

7. The method of claim 1, further comprising:
   receiving the MIC with the first message prior to receiving the key.

8. The method of claim 1, wherein the plurality of scheduled time intervals comprise a plurality of consecutive key disclosure intervals identified during a handshake period between a station and an access point.

9. The method of claim 8, wherein the handshake period comprises a pre-scheduled time interval, the pre-scheduled time interval comprising at least one of a periodic beacon message, an acknowledgment message, or a combination thereof.

10. The method of claim 1, wherein the MIC is generated using the key.

11. An apparatus for authenticating messages in a wireless communication, comprising:
    a receiver to receive a first message with a message integrity code (MIC) and to receive a trust anchor MIC key;
    a key identifier to receive a key associated with the first message in a second message, wherein the second message is different from, received subsequent to, and used at least in part to authenticate the first message;
    a trust anchor component to apply a hash function to the key to generate a derived key and to authenticate the key associated with the first message based at least in part on the derived key and the trust anchor MIC key;
    a key interval component to determine the key is authentic based at least in part on comparing a time stamp of the second message with an interval schedule that indicates in which time interval of a plurality of scheduled time intervals to anticipate disclosure of the key; and
    a message authentication component to authenticate the first message based in part on the key and the determining.

12. The apparatus of claim 11, further comprising:
    the trust anchor component to update the trust anchor MIC key with the authenticated key.

13. The apparatus of claim 11, further comprising:
    a MIC verification component to authenticate the MIC based at least in part on the key; and
    the message authentication component to authenticate the received first message based in part on the authenticated MIC.

14. The apparatus of claim 11, further comprising:
    a time stamp verification component to verify that the time stamp of the second message matches a time stamp associated with the interval schedule.

15. The apparatus of claim 11, further comprising:
    the key identifier to receive a second key associated with the first message in a third message, wherein the third message is different from, and received subsequent to, the first message; and
    a time stamp verification component to discard the second key upon determining that a second time stamp of the third message fails to correspond with a time stamp associated with the interval schedule.

16. The apparatus of claim 11, further comprising:
    the receiver to receive the MIC with the first message prior to receiving the key.

17. The apparatus of claim 11, wherein the plurality of scheduled time intervals comprise a plurality of consecutive key disclosure intervals identified during a handshake period between a station and an access point.

18. The apparatus of claim 17, wherein the handshake period comprises a pre-scheduled time interval, the pre-scheduled time interval comprising at least one of a periodic beacon message, an acknowledgment message, or a combination thereof.

19. An apparatus for authenticating messages in a wireless communication, comprising:
    a processor;
    memory in electronic communication with the processor; and
    instructions stored in the memory, wherein the instructions are executable by the processor to:

receive a first message with a message integrity code (MIC);

receive a key associated with the first message in a second message, wherein the second message is different from, received subsequent to, and used at least in part to authenticate the first message;

apply a hash function to the key to generate a derived key;

receive a trust anchor MIC key;

determine the key is authentic based at least in part on the derived key, the trust anchor MIC key, and comparing a time stamp of the second message with an interval schedule that indicates in which time interval of a plurality of scheduled time intervals to anticipate disclosure of the key; and authenticate the first message based in part on the key and the determination.

20. The apparatus of claim 19, wherein the instructions are executable by the processor to:
update the trust anchor MIC key with the authenticated key.

21. The apparatus of claim 19, wherein the instructions are executable by the processor to:
receive a unicast message via a secured channel.

22. The apparatus of claim 19, wherein the instructions are executable by the processor to:
authenticate the MIC based at least in part on the key, wherein authenticating the received first message is based in part on the authenticated MIC.

23. The apparatus of claim 19, wherein determining the key is authentic comprises instructions executable by the processor to:
verify that the time stamp of the second message matches a time stamp associated with the interval schedule.

24. The apparatus of claim 19, wherein the instructions are executable by the processor to:
receive a second key associated with the first message in a third message, wherein the third message is different from, and received subsequent to, the first message; and
discard the second key upon determining that a second time stamp of the third message fails to correspond with a time stamp associated with the interval schedule.

25. The apparatus of claim 19, wherein the instructions are executable by the processor to:
receive the MIC with the first message prior to receiving the key.

26. The apparatus of claim 19, wherein the plurality of scheduled time intervals comprise a plurality of consecutive key disclosure intervals identified during a handshake period between a station and an access point.

27. A non-transitory computer-readable medium storing code for wireless communication at a wireless station, the code comprising instructions executable to:
receive a first message with a message integrity code (MIC);
receive a key associated with the first message in a second message, wherein the second message is different from, received subsequent to, and used at least in part to authenticate the first message;
apply a hash function to the key to generate a derived key;
receive a trust anchor MIC key;
determine the key is authentic based at least in part on the derived key, the trust anchor MIC key, and comparing a time stamp of the second message with an interval schedule that indicates in which time interval of a plurality of scheduled time intervals to anticipate disclosure of the key; and
authenticate the first message based in part on the key and the determination.

28. An apparatus for authenticating messages in a wireless communication, comprising:
means for receiving a first message with a message integrity code (MIC);
means for receiving a key associated with the first message in a second message, wherein the second message is different from, received subsequent to, and used at least in part to authenticate the first message;
means for applying a hash function to the key to generate a derived key;
means for receiving a trust anchor MIC key;
means for determining the key is authentic based at least in part on the derived key, the trust anchor MIC key, and comparing a time stamp of the second message with an interval schedule that indicates in which time interval of a plurality of scheduled time intervals to anticipate disclosure of the key; and
means for authenticating the first message based in part on the key and the determining.

* * * * *